United States Patent [19]

Kramer

[11] Patent Number: 4,931,871
[45] Date of Patent: Jun. 5, 1990

[54] METHOD OF AND SYSTEM FOR IDENTIFICATION AND VERIFICATION OF BROADCASTED PROGRAM SEGMENTS

[76] Inventor: Robert A. Kramer, 627 14th St., Santa Monica, Calif. 90402

[21] Appl. No.: 206,294

[22] Filed: Jun. 14, 1988

[51] Int. Cl.$^5$ .................. H04N 7/08; H04N 7/04; H04N 9/00; H04B 17/00
[52] U.S. Cl. .................................... 358/142; 358/143; 358/84; 455/2
[58] Field of Search ............... 358/84, 86, 142, 143, 358/144, 145, 146, 147, 198; 370/76; 375/91; 455/2, 49, 53, 67

[56] References Cited

U.S. PATENT DOCUMENTS

| | | |
|---|---|---|
| 3,845,391 | 10/1874 | Crosby .................................. 455/45 |
| 4,547,804 | 10/1985 | Greenberg ......................... 358/147 |
| 4,703,476 | 10/1987 | Howard ............................... 370/76 |

FOREIGN PATENT DOCUMENTS 2040129 8/1980 United Kingdom ............... 358/146

Primary Examiner—John W. Shepperd
Assistant Examiner—Michael D. Parker
Attorney, Agent, or Firm—Leonard Bloom

[57] ABSTRACT

A method of and system for identification and verification of TV and/or radio broadcasted program segments involving use of subaudible codes which are mixed with the convention audio in the program segments. Individual program segments, which may include commercial message segments, have at the beginning thereof a preamble code (such as a predetermined number of cycles of 40 Hz.), a program segment identification code (which may consist of a series of alphanumeric characters) and a postamble code (such as a given number of cycles of 40 Hz.). The program segment codes may consist of a series of mark and space signals (such as presence and absence of 40 Hz. signals). A plurality of broadcast stations are monitored, the codes recovered and data sets defined, stored and later sent to a central location for reconciliation and/or compilation.

33 Claims, 8 Drawing Sheets

DATA SYNC IN (FROM FIG. IB)
MODULATION OUT
(TO FIG. IB)
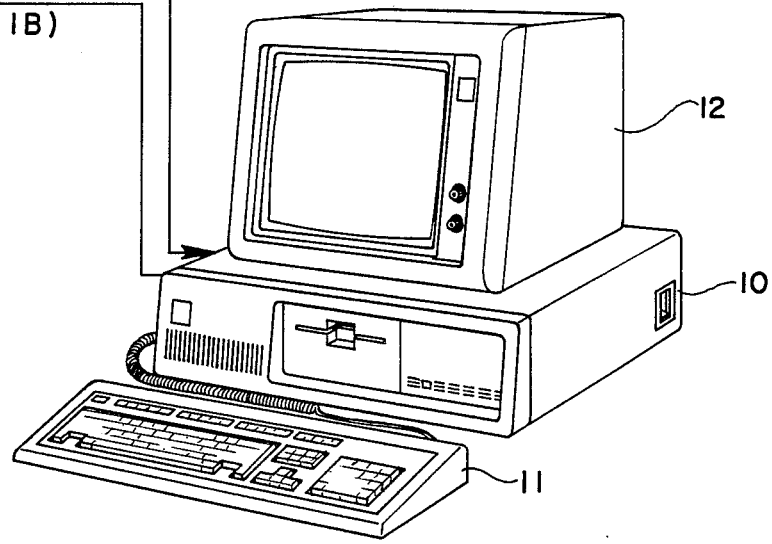
Fig. IA

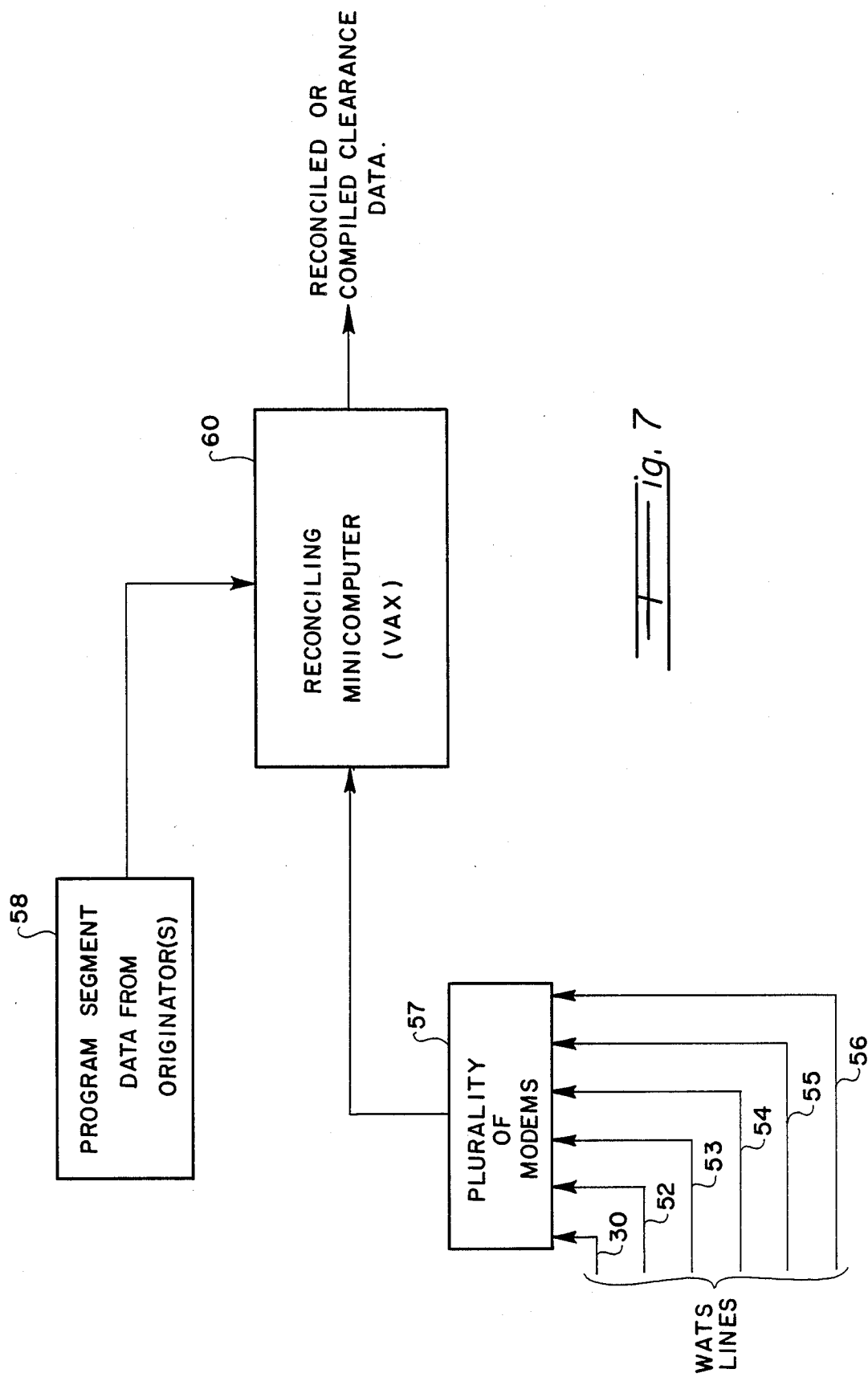

METHOD OF AND SYSTEM FOR IDENTIFICATION AND VERIFICATION OF BROADCASTED PROGRAM SEGMENTS

BACKGROUND OF THE INVENTION

1. Field of Invention

This invention relates generally to an improved method of and system for automatically identifying and verifying television and radio program segments, including commercial messages, using identification codes. More particularly, the present invention relates to such an improved method and system which do not degrade program quality, are not perceptible to a listener or viewer and are very reliable.

2. Description of the Prior Art

Over the years two general techniques have been developed in program identification systems; these are identification encoding and pattern recognition, but these techniques as thus far developed have been found to be substantially limited and have not been entirely satisfactory.

Program identification coding methods have been divided into two general areas, audio and video ending. Audio encoding (e.g. U.S. Pat No. 3,845,391 to Crosby) has proven to be unsatisfactory for television broadcasting. In the final report of the Ad Hoc Committee On Television broadcast Ancillary Signals Of The Joint Committee On Intersociety Coordination (published May, 1978), the Journal Of The Society Of Motion Picture and Television Engineers found the aforementioned audio program identification to be extremely unreliable and caused significant degradation of program signal quality.

Video encoding has also proved to be less than satisfactory for television broadcasting. In U.S. Pat No. 4,025,851 to Haselwood et al. for network clearance monitoring, a 48 character digital code is placed onto the vertical blanking interval of line 20. While the use of line 20 reduced the degradation of the program signal quality, the encoding system used therein is overly complex and inadequate. This system utilizes a changed line format for the handling of the data, which requires complex data processing, encoding, storage and verification. In addition, the system is only able to monitor the broadcast of a single network with an inability to scan more than one channel. Moreover, only a method and system for the identification of the program is disclosed with there being no teaching as to the integration and recording of information as to the program's audio and visual quality.

A process for automatic electronic recognition and identification of programs and commercial advertisements broadcast on television and radio has been proposed in U.S. Pat. No. 3,919,479 to Moon et al., wherein a digitally sampled reference signal segment derived from either the audio or video portion of the original program content to be identified is compared with successive digitally sampled segments of the corresponding audio or video portion of a broadcast signal in a correlation process to produce a correlation function signal. The sampling rates and the time duration of the reference signal segment and the broadcast signal segments are the same. When the signal segments which are compared are the same, the correlation function signal is relatively large and a recognition thereof is achieved when such correlation function signal exceeds a selected threshold level. The compared signal segments may also be obtained as low frequency signals derived from the original reference and broadcast signals by non-linear and envelope formation processing techniques. This example of computerized pattern recognition is very complex and related solely to program content.

None of the above-noted prior attempts to verify the broadcasting of commercial messages have met with wide acceptance, because each requires either changes in operating procedures, purchase of external hardware, or some amount of manual reconciliation.

Radio and television stations earn the bulk of their revenue by broadcasting commercial messages. Some of these messages are for local advertisers, while a variable percentage is derived from so-called national advertisers. It is customary for these national advertisers to employ advertising agencies to create the actual commercials to be aired; these agencies then proceed to buy air time in the desired radio/television markets. Due to the sheer numbers of markets and broadcast outlets (air time is generally purchased on more than one station within a market, and many markets can be specified), the agencies usually make use of firms which represent the individual stations. If a radio or television network is included, the network is contacted, and time is purchased. Thus, a commercial can reach an individual station by one of two routes, via a wired network (such as ABC, NBC or CBS), or through an "un-wired" network, such as one of the national station-representing firms. In both circumstances, it is necessary that the network and the agency have some means of verifying that the commercial(s) were broadcast as specified.

At present, these verifications (affidavits of performance) are generally generated manually, by each radio and television station. The originating network must then collect and reconcile each of these affidavits, also manually. This process is very lengthy and prone to error. Only after the affidavits are reconciled can payment to the networks and stations be made. The average lead time for payment to a local television or radio station, broadcasting a nationally-originated commercial, is four-to-six months. Most of this delay is directly attributable to the manual processing involved, and virtually all station and network personnel, for a variety of reasons, are desirous of a faster, more reliable, automated means of verifying broadcasts.

SUMMARY OF THE INVENTION

An object of the present invention is to provide a novel and improved method of and system for automatic television and radio broadcast program segment identification and verification.

Another object is to provide a novel and improved method of and system for automatic television and radio broadcast program segment identification and verification that does not degrade the broadcast content.

A further object is to provide a novel and improved method of and system for automatic television broadcast program segment identification and verification that can monitor one or more channels at a time.

An additional object is to provide a novel and improved method of and system for automatic television broadcast program segment identification and verification wherein the program data generates subsequent data which is stored locally and later sent to a central evaluation center.

Yet another object is to provide a method of and system for automatic television and radio broadcast program segment identification and verification which does not require any modification of standard broadcasting studio and/or transmitting equipment.

Yet a further object of the present invention is to provide a method of and a system for automatic television and radio broadcast program segment identification and verification which is both simple and reliable.

Yet an additional object of the present invention is to provide a method of and system for automatic television and broadcast commercial message identification and verification.

Still another object of the present invention is to provide a method of and a system for automatic television and radio broadcast commercial message which produces data indicative of interruptions of identified commercial messages identification and verification.

An improved method of and a system for identification and verification of radio and television transmitted program and commercial materials are provided in accordance with the present invention. Assurance of proper airing of these materials is achieved through an encoded subaudible message received by the system described herein, and transmission to a central reconciliation point of these encoded messages for the purpose of generating proof-of-performance affidavits. The present invention utilizes a unique program identification code, which is recorded in the main audio channel. This code is intended for recording on a master tape of the program or commercial, and subsequent duplications of this master tape would likewise contain the identification code. Radio and television stations broadcasting the tape need add no hardware, nor make any changes whatsoever in their operating procedures. A code receiving device, which monitors all radio and television stations in a given market area, is, in effect, a multi-channel receiver, programmed to filter out all material except the transmitted subaudible codes based on a single frequency subaudible tone. In this manner, the receiving device identifies the transmitting radio and television stations, the code (and thus the particular program segment, such as a commercial message) and,— in effect, stamps this data with the time and date, and, if desired, a signal which indicates whether or not the individual program segments, including individual commercial messages, was broadcasted in its entirety. Thus, it is possible to monitor an entire market's broadcast facilities (radio and television, including cable sources). At a given time each day, the monitoring receiving station transmits all received codes (along with the identifying data), through a modem, to a central reconciliation location. The central reconciliation location may include a computer which compares the received data with information supplied at the time the original program encoding occurred. In this manner, affidavits proving performance (necessary for payment of advertising charges for networks and individual stations) can be generated on a market-by-market basis, along with such statistical data regarding these broadcast programs as may be deemed desirable.

From one vantage point the invention can be viewed as a system for identification and verification of broadcasted program segments, which may include commercial message segments. The system includes a plurality of broadcasting stations for broadcasting signals which include program segments having a subaudible preamble code, respective subaudible program segment identification codes, following each preamble code occurrence, and a subaudible postamble code following each program segment identification code occurrence. At least one monitoring station receives the broadcasted signals. The monitoring station includes (a) means for generating date-indicating and time-indicating signals, (b) respective channels responsive to the broadcasted signal from each respective broadcasting station for recovering each received preamble code, each received respective program segment identification code and each received postamble code and (c) means for providing respective broadcast station-identification signals. Storing means at the monitoring station store as data signal representations of each occurrence of the recovered preamble code, the recovered respective program segment identification code and recovered postamble code, the date-indicating and time-indicating signals, and the station-identifying signals for each channel. Means at the monitoring station send the stored data signal representations to a central station. The central station is provided with means for receiving data from a plurality of monitoring stations to compile and/or to reconcile the received data with program segment data provided by the originator(s).

The invention can also be seen as being in a system for identification and verification of broadcasted program segments, some or all of which may be commercial message segments, from a plurality of broadcasting stations. At least one monitoring station receives broadcasted signals from broadcasting stations. The monitoring station includes (a) means for generating date-indicating and time-indicating signals, (b) respective channels responsive to respective broadcasted signals from respective broadcasting stations for recovering a subaudible preamble code, respective subaudible program segment identification codes, and a subaudible postamble code, and (c) means for providing respective broadcast station-identification signals. Means at the monitoring station store as data signal representations of each occurrence of the recovered preamble code, the recovered respective program identification codes and the postamble code, the date-indicating and time-indicating signals, and the station-identifying signals for each channel. Means at the monitoring station send the stored data signal representations to a central station. The central station is provided with means for receiving data from a plurality of monitoring stations to compile and/or to reconcile the received data with program data provided by the originator(s).

The invention can also be seen as being in a system for identification and verification of broadcasted program segments from a plurality of broadcasting stations. At least one monitoring station is provided for receiving broadcasted signals from broadcasting stations. The monitoring station has (a) means for generating date-indicating and time-indicating signals, (b) respective channels responsive to respective broadcasted signals from respective broadcasting stations for recovering a subaudible preamble code, respective subaudible program segment identification codes of each program segment received therefrom and a subaudible postamble code, and (c) means for providing respective broadcast station-identification signals. Storing means at the monitoring station store as data signal representations of each occurrence of the recovered preamble code, the recovered commercial message identification codes, the preamble code, the date-indicating and time-indicating signals, and the station-identifying signals for each channel.

From a slightly different point of view the invention can be seen as being in a system for identification and verification of broadcasted program segments from a plurality of broadcasting stations. One or more of the segments may be a commercial message segment. At least one monitoring station receives broadcasted signals from broadcasting stations. The monitoring station is provided with (a) means for generating date-indicating and time-indicating signals, (b) respective channels responsive to respective broadcasted signals from respective broadcasting stations for recovering program segment identification codes therefrom, and (c) means for providing respective broadcast station-identification signals. Storing means at the monitoring station stores as data signal representations of occurrences of the recovered program segment identification codes, the date-indicating and time-indicating signals, and the station-identifying signals for each channel.

The plurality of broadcasting stations may include television stations and standard radio broadcasting stations.

The standard radio broadcasting stations may include frequency modulation broadcast stations and amplitude modulation broadcast stations.

Some of the broadcast stations may be cable channels of a distribution system.

The subaudible program segment identification codes may consist of respective series of alphanumeric characters. The characters in a code may consist of four letters and four numerals. The alphanumeric characters are formed by a series of mark signals and space signals, defined respectively by presence and absence of a 40 Hz. subaudible signal.

The subaudible preamble code may consist of a predetermined number of cycles of 40 Hz. signal and the subaudible postamble code consists of a given number of cycles of 40 Hz. signal.

In the event one wishes to check whether or not any given program segment was transmitted in its entirety, the respective program segment identified code is positioned immediately after the preamble code and is repeated a sufficient number of times up until the postamble code starts.

In its method aspect, the invention may be seen as a method of identification and verification of broadcasted program segments, which includes the step of providing program segments having a subaudible preamble code, respective subaudible program segment identification codes and a subaudible postamble code, and broadcasting the program segments with the codes from a plurality of broadcast stations. Thereafter, the method involves receiving at a monitoring location broadcasted signals, including the program segments and the codes, from the plurality of broadcast stations, and deriving from the received broadcast signals the preamble code, the respective program segment identification codes and the postamble code. The method also includes providing at the monitoring location respective broadcast station identification signals, and generating at the monitoring location respective date-indicating and time-indicating signals. Then, the method provides for storing at the monitoring location signals representing occurrences of the preamble code, the respective program segment identification codes and the postamble code when received, each broadcast station identification signal from which each program segment was received each time it is received therefrom and the date-indicating and time-indicating signals each time a program segment is received. Thereafter, the method provides for sending the stored signals as data to a central point which also receives data from other monitoring locations for compilation and/or reconciliation.

The method, from a somewhat different vantage point can be seen as a method of identification and verification of broadcasted program segments which involves providing program segments having a subaudible preamble code, respective subaudible program segment identification codes and a subaudible postamble codes. In accordance with the method, it provides for receiving at a monitoring location broadcasted signals, including the program segments and codes, from a plurality of broadcast stations, and deriving from the received broadcast signals the preamble code, the respective program segment identification codes and the postamble code. The method further involves providing at the monitoring location respective broadcast station identification signals and generating at the monitoring location respective date-indicating and time-indicating signals. Thereafter, the method involves storing at the monitoring location signals representing occurrences of the recovered preamble code, the recovered respective program segment identification codes and the recovered postamble code, when received, each broadcast station identification signal from which each program segment was received each time it is received therefrom and the date-indicating and time-indicating signals each time a program segment is received. The method also provides for sending the stored signals as data to a central point which also receives data from other monitoring locations for compilation and/or reconciliation.

This invention can also be viewed as a method of identification and verification of broadcasted program segments which involves providing program segments having a subaudible preamble code, respective subaudible program segment identification codes and a subaudible postamble code, and receiving at a monitoring location broadcasted signals, including the program segments and the codes, from the plurality of broadcast stations. The method provides for deriving from the received broadcast signals the preamble code, the respective program segments identification codes and the postamble code, and generating at the monitoring station respective broadcast station identification signals. The method also provides the steps of generating at the monitoring location respective date-indicating and time-indicating signals; and storing at the monitoring location as data signals representing occurrence of the preamble code, the respective program segment identification codes and the postamble code when received, each broadcast station identification signal from which each program segment was received, each time it is received therefrom, and the date-indicating and time-indicating signals each time a program segment is received.

In some cases the preamble and postamble codes need not be broadcasted in the event one wants to determine only if the program segment was broadcasted without, regard to whether or not it was broadcasted in its entirety.

As with the system, in practicing the method, the program segments may include or consist solely of commercial message program segments.

It is also desirable in practicing the method to provide the program segment identification code during the entire time period between the preamble and postamble codes so that one can determine if any breaks occurred in the program segment. This is especially desirable when the program segment involved is a commercial message segment.

BRIEF DESCRIPTION OF THE DRAWINGS

FIGS. 1A and 1B constitute a schematic diagram of an exemplary embodiment of a circuit for encoding program segments, including commercial messages, which is particularly useful in practicing the present invention in both its system and method aspects.

FIG. 7 is a simplified block diagram of an exemplary embodiment of a data center at which data from a plurality of receiving stations can be gathered, completed and/or reconciled.

DETAILED DESCRIPTION OF THE PREFERRED EMBODIMENTS

Figure 1B:
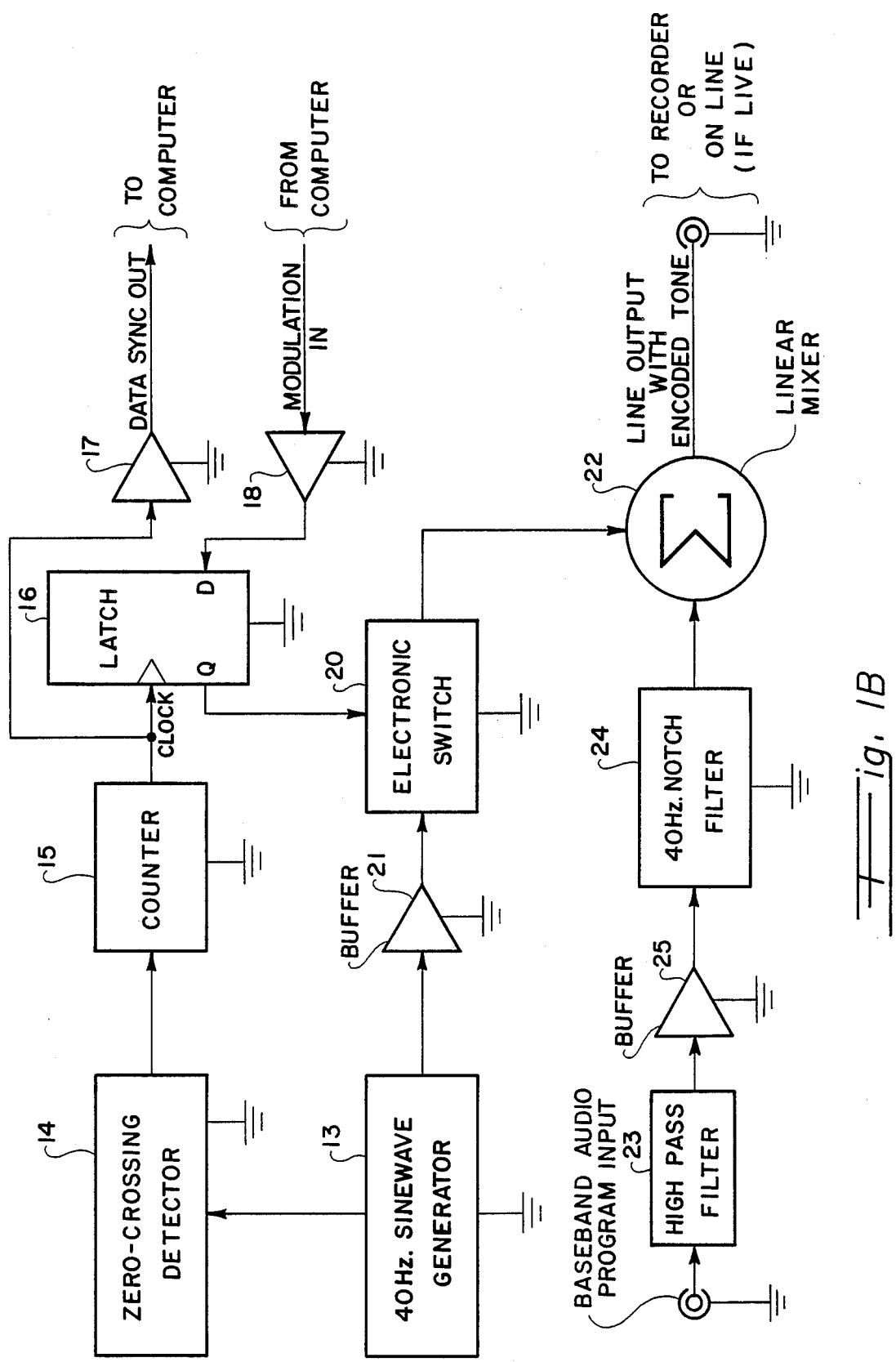

The exemplary circuit for encoding program segments, including commercial messages, in accordance with a realized version of the present invention, as shown in FIGS. 1A and 1B include a programmed computer 10, which may be an IBM-PC-XT TM provided with a hard disk drive and one floppy disk drive, as illustrated. The circuit is provided with a conventional keyboard 11 and a conventional monochrome monitor 12, these three components being connected together by conventional cables (not shown).

The exemplary circuit includes a highly stable 40 Hz. sinewave generator 13 supplying its 40 Hz. output to a zero-crossing detector 14 which produces an output signal each time the 40 Hz. input signal received from the generator 13 passes through zero. The output from the zero-crossing detector is fed to a counter 15, which produces an output pulse train having a pulse repetition rate of 40 pulses per second, this pulse train being fed to the clock input terminal of a latch 16 which, in a realized embodiment was constituted by a commercially available semiconductor chip sold under the designation 74HC74.

Figure 2:
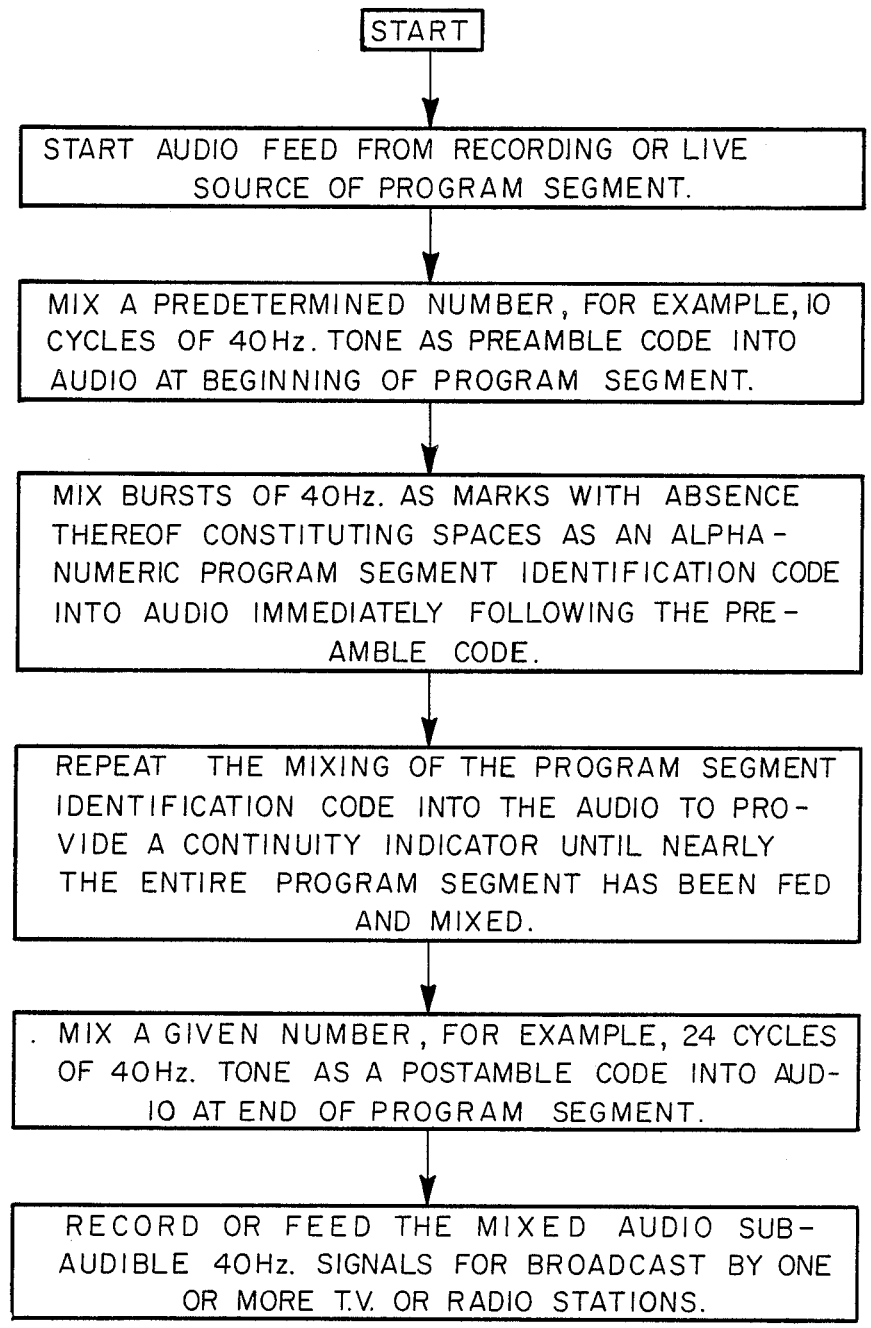
FIG. 2 is a flowchart helpful in understanding the operation of the circuit illustrated in FIGS. 1A and 1B.

The output pulse train from the counter 15 is also fed, as a data synchronization signal, to the computer 10 via a buffer 17. Thus, the computer 10 can be operated in synchronism with the 40 Hz. generator 13 and supply its output, labeled "modulation in" to the data terminal (D) of the latch 16 via a buffer 18. The output terminal (Q) of the latch 16 is connected to the control input terminal of an electronic switch 20 which receives a constant 40 Hz. input, at its signal input terminal, from the 40 Hz. generator 13, via a buffer 21. In operation, the electronic switch 20 passes controlled bursts of 40 Hz. signals to a linear mixer 22, under control of the computer 10. The computer 10, in the exemplary realized embodiment, was programmed, using assembly and C languages as set out in the section labeled "Programs" hereinbelow. It is to be understood that other programs may be used to achieve the same ends and in FIG. 2 so that the 40 Hz. signals are selectively passed to mixer 22 as required.

A baseband audio signal, from a live source or from playback of one or more previously recorded program segments is fed via a conventional input connection to a high pass filter 23, which passes signals above 116 Hz. The output from the high pass filter 23 is fed to a 40 Hz. notch filter 24, via a buffer 25. The action of the filters 23 and 24, acting together result in any 40 Hz. signal which appears in the baseband audio being 30 d.b. below other signal components. Thus, any 40 Hz. signals which are passed, via the electronic stitch 20, to the linear mixer 22 are virtually free of possible interference from signals of 40 Hz. which may be in conventional audio feeds.

The output from the linear mixer 22 appears as a line output, with encoded 40 Hz.-based signals thereon. This mixed output is preferably rerecorded for distribution to a network (wired or unwired) and/or individual selected broadcast stations for later broadcast. Alternatively, the line output with the encoded 40 Hz. signals could be fed live to distribution lines for either immediate broadcast or remote recording for later broadcast.

Figure 3:
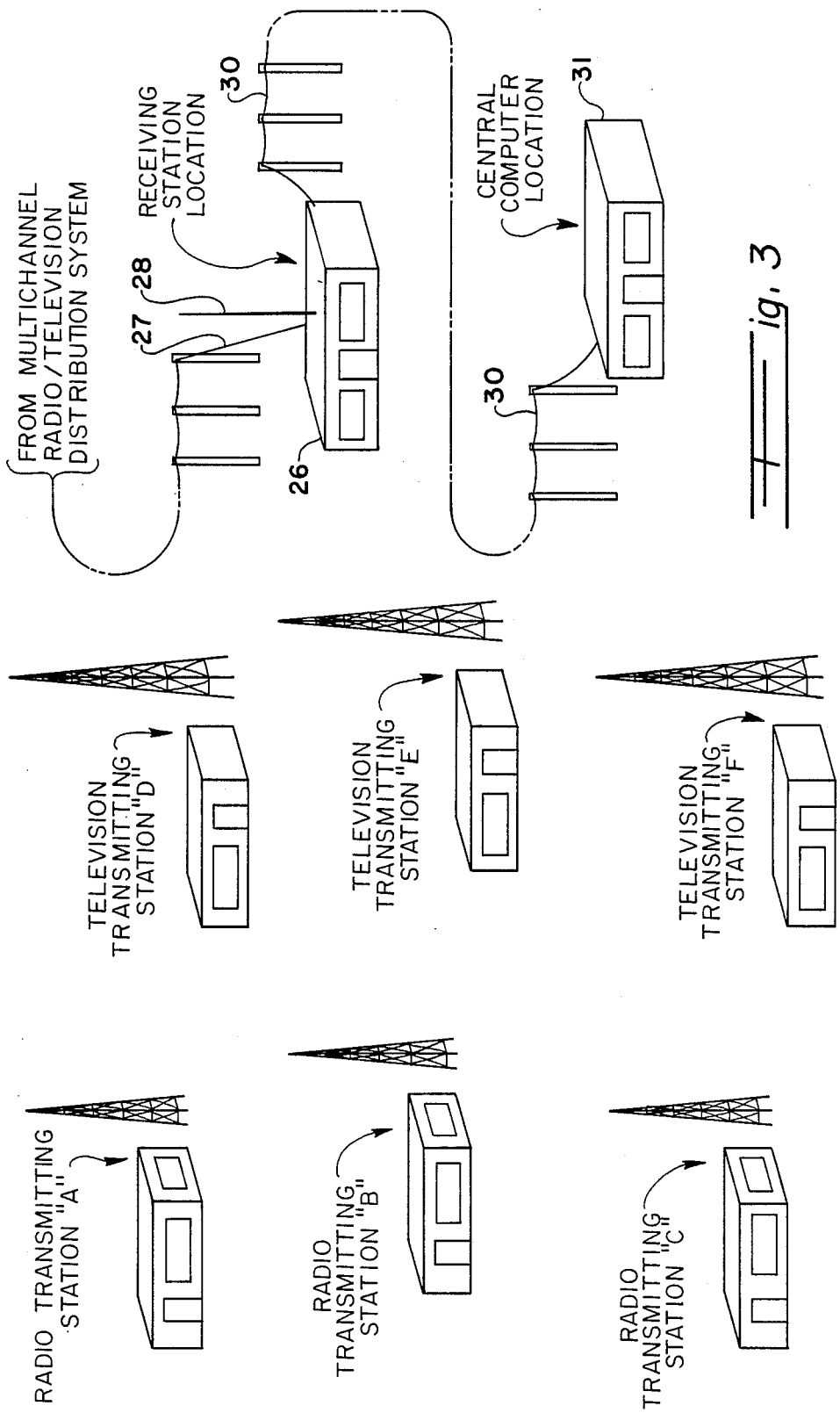
FIG. 3 is a somewhat diagrammatic, pictorial view exemplifying the geographic relationship among broadcast stations, including cable stations, a multichannel receiving station and a central computer location helpful in understanding the present invention, in both its system and method aspects.

Once the program segments, which may include both commercial messages and entertainment segments, have been modified and/or produced using the circuit of FIGS. 1A and 1B, the thus modified program segments having the codes thereon are broadcasted one or more times from one or more television and/or radio stations in various markets throughout the country. In most instances, different encoded program segments may be broadcasted in a given geographic market area, shown diagrammatically in FIG. 3, during the same time period from different broadcast stations. As shown in FIG. 3, by way of example, the market area includes a plurality of radio transmitting stations, three such stations "A", "B" and "C" being shown in FIG. 3; these stations may be FM or AM stations. The market area also includes a plurality of television transmitting stations, three such stations being shown in FIG. 3 by way of example; these stations may be VHF or UHF stations. The market area may also include one or more multichannel radio/television distribution systems. In FIG. 3, one such system is shown as being wired to a program monitoring receiving station 26, via a pole-supported service, illustrated as a coaxial cable 27. As a simplified illustration, a broad band receiving antenna 28 is shown as a means for receiving transmissions from the transmitting stations "A"-"F". If desired a parabolic receiving structure could also be provided for receiving other broadcasted signals, such as those from a satellite broadcast service. The receiving station 26, which is illustrated schematically in detail in FIG. 4, is provided with a WATS line 30, or a similar communication arrangement, whereby data from the receiving station may be fed to a central computer location 31, at which location additional data from a plurality of other receiving stations is also received and compiled and/or reconciled with program segment data from the originator(s).

Thus, it may be determined, for a multiple market area, whether or not particular program segments——including commercial messages——have been actually broadcasted as intended and whether or not the individual segments have been broadcasted in the entirety.

Figure 4:
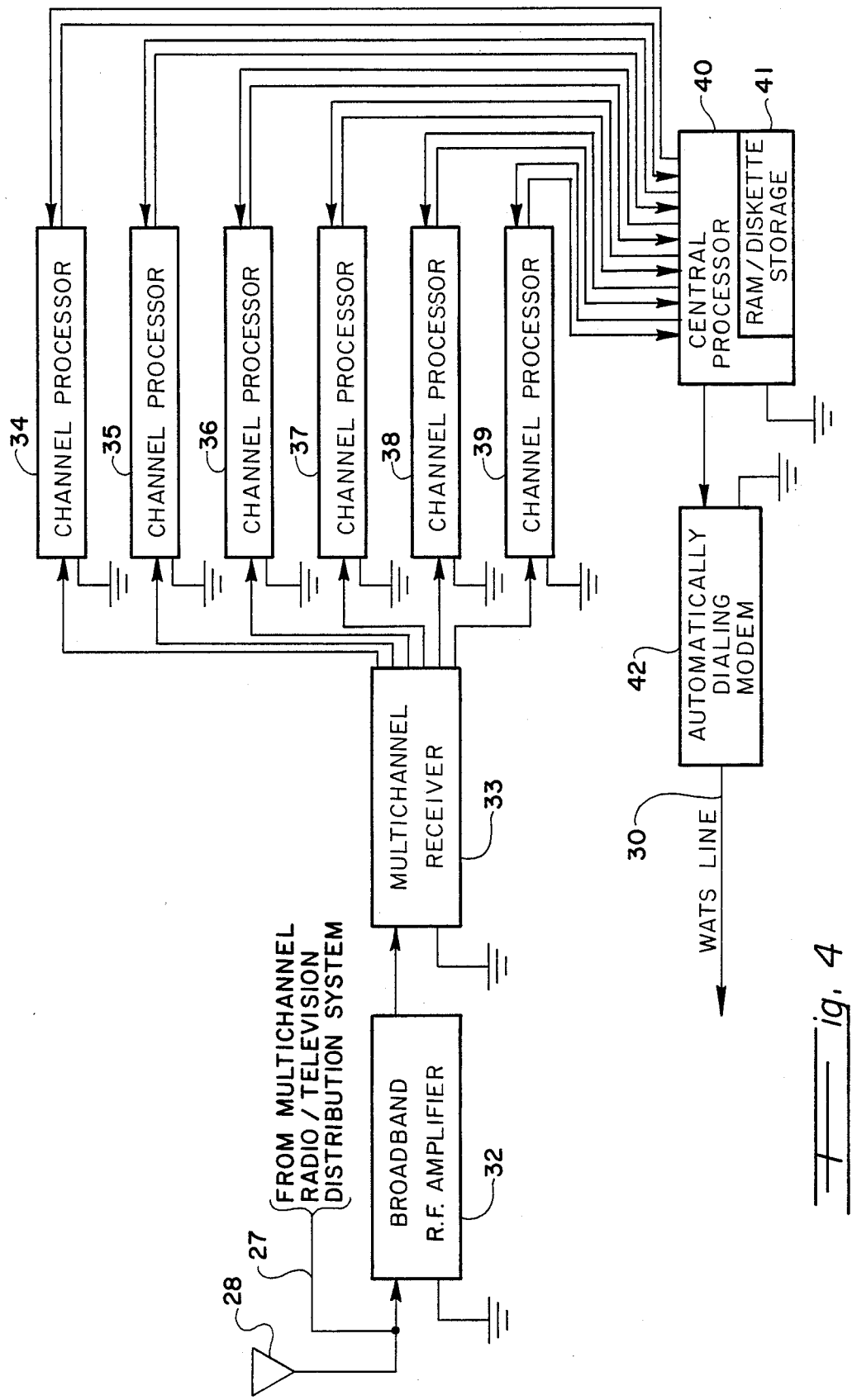
FIG. 4 is a simplified block diagram of an exemplary multichannel receiving station which may be used in practicing the present invention in its system and method aspects.

Turning to FIG. 4, which illustrates circuit details of the circuitry of the receiving station 26 (FIG. 3), the circuitry includes the broadband antenna 28 and a coaxial cable 27 from the cable distribution network. The output from the antenna 28 and the coaxial cable 27 are fed to a broadband R.F. amplifier 32 having its output connected to a multichannel receiver 33 which is provided with a conventional receiver channel for each of the broadcasting channels which are to be monitored. A respective channel processor 34–39 is coupled to the respective receiver channels in the multichannel receiver 33, one receiver channel and one receiver channel processor being provided for each broadcast station to be monitored, six processing channels being shown for purposes of illustration. In many cases, an installation could involve many more channels, even hundreds. The circuit details of an exemplary channel processor, which may be used for the individual channel processors, is illustrated in FIG. 5 to which more detailed reference is to be made hereinbelow.

Returning to FIG. 4, the circuitry within the receiving station 26 (FIG. 3) also includes a central processor 40 having a RAM/diskette storage 41, each of the channel processors 34–39 being controlled by the central processor and feeding, under control of the central processor, data sets relating to the encoded program segments as derived by the channel processors to the central processor. The central processor 40 is operatively arranged to feed the data sets stored in its RAM (or retrieved from its diskette storage) to an automatically dialing modem 42 on a programmed basis, for example at a particular time after midnight each day, the data sets being fed to the WATS line 30 and, thence, to the central computer location 31. It is to be appreciated that each of the respective channel processors 34–39 is transmitting-station specific and, thus, can operate to automatically tag each received transmitting station identification. The individual channels 34–39 are also provided with date and time signal from a DOS clock within the central processor and arranges to place a date and time stamp at the beginning and end of each data set received.

Figure 5:
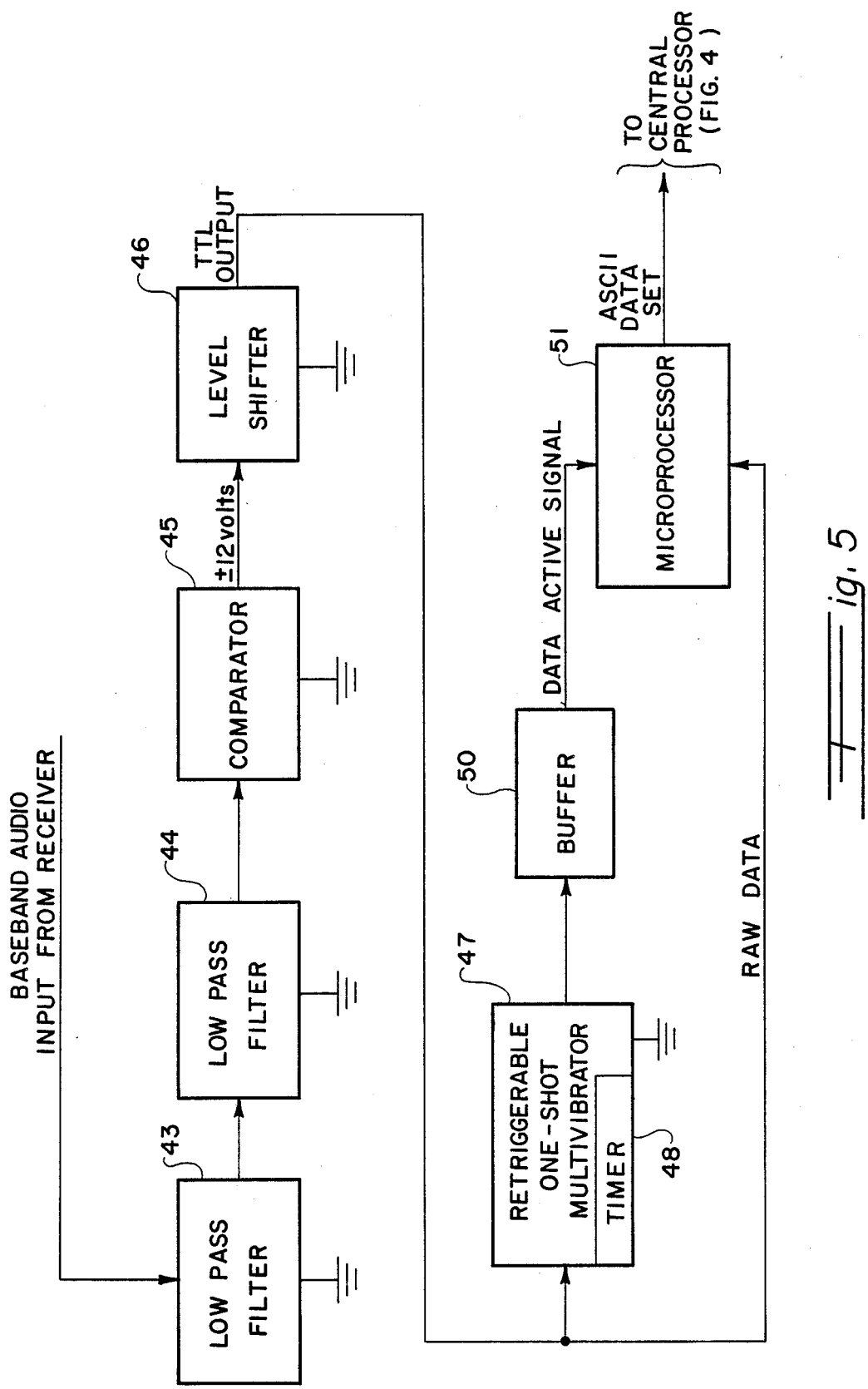
FIG. 5 is an exemplary embodiment of a signal processing channel, a plurality of which may be used for the channels in the receiving station illustrated in FIG. 4.
Figure 6:
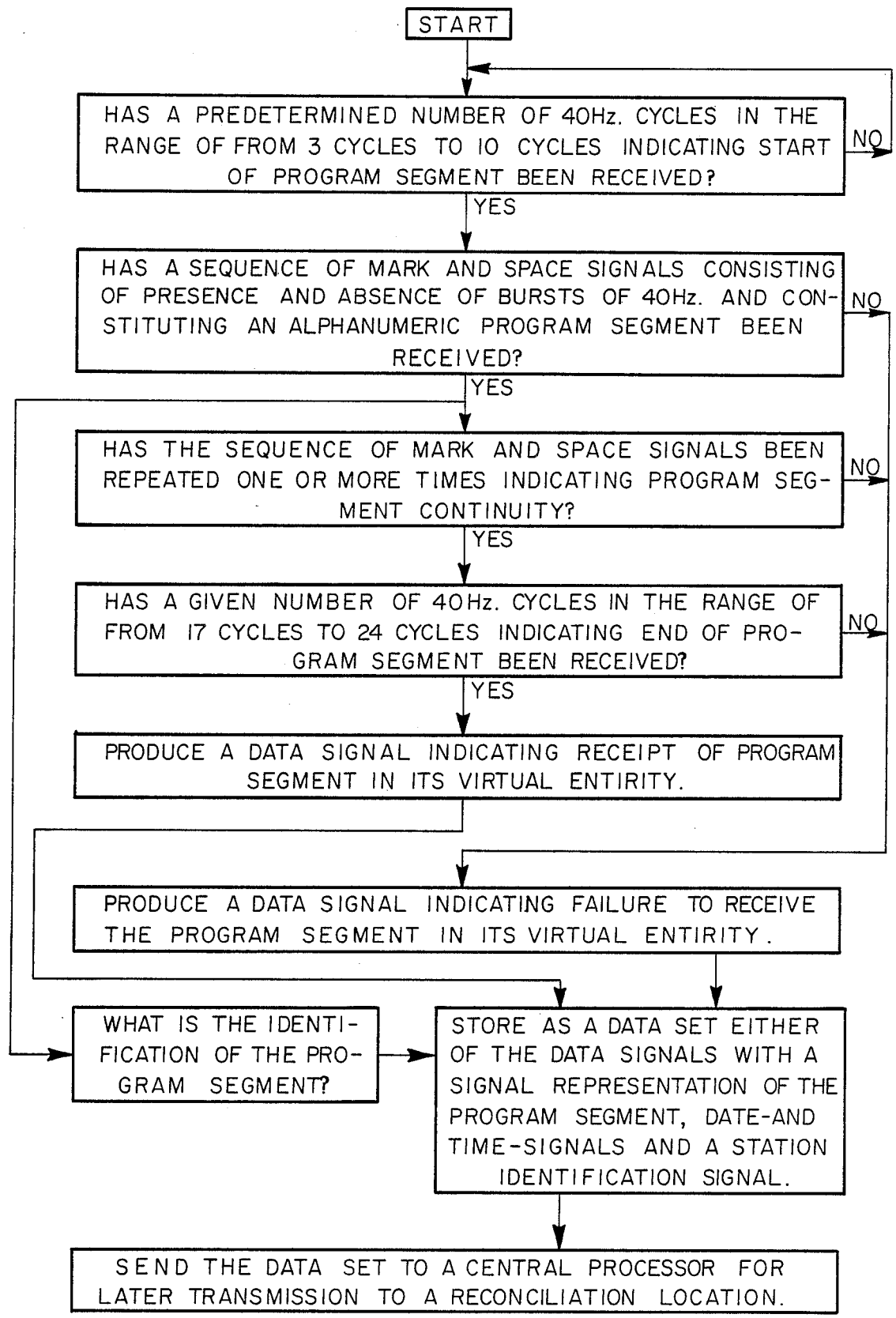
FIG. 6 is a flowchart helpful in understanding the operation of the microprocessor forming part of the circuit shown in FIG. 5.

Each of the channel processors 34–39 (FIG. 4) is constructed as illustrated in FIG. 5, the baseband audio output from a respective one of the channels of the multichannel receiver 33 (FIG. 4) being fed to a 10 KHz. low pass pre-filter 43 of the fifth order providing filtering at 3 d.b. per octave. The filter 43, in the case of FM stereo and/or TV effects the removal of subcarrier artifacts. The output from the filter 43 is fed to a low pass filter 44 of a modified five-pole Butterworth type having corners set at 155 Hz. The output of the low pass filter 44 is fed to a comparator 45 which compares the input signal with a reference voltage providing as its output±12 volts depending on whether or not a 40 Hz. component is present or is not present in the signal received from a respective one of the receiver channels. A level shifter 46, which receives the output from the comparator 45, converts the signal into a conventional TTL output, a+5 volts and zero volts signal which is fed to a retriggerable one-shot multivibrator 47 provided with a timer 48, realized as a NE 555 chip set to provide 37 millisecond timing pulses so that the DATA is, in effect, looked at at certain times. The TTL output from the level shifter 46 is also fed as raw DATA to a microprocessor 51 which also receives a DATA active signal as its controlling input from the one-shot multivibrator 47 via a buffer 50. The microprocessor 51, which includes a 2K RAM for temporary storage, converts the TTL pulse train to an ASCII data set which is supplied to the central processor 40 (FIG. 4), under the control thereof, as are the outputs from the other processor channels (FIG. 4). The microprocessor 51 under control of the central processor 40 (FIG. 4) carries out the routines set out in flowchart form in FIG. 6. In operation, the microprocessor 51 for each channel supplies in ASCII data set form for each program segment monitored a code sequence which consists of station ID, preamble code, program segment identification code, postamble code, dropout signal (if segment not received in its entirety), and day and time signals.

As stated above, the central processor 40 supplies its output from RAM or diskette storage 41 via the modem 42 and a WATS line 30 to one of a plurality of MODEMS 57 at the central computer location 31 (FIG. 3). The modems 57 also receive inputs from other monitoring receiver stations, for example via WATS lines 52–56, supplying output therefrom to a reconciling minicomputer 60, which may be a VAX computer which is also provided in program segment data from the originator or originators thereof, as indicated by the block 58. The minicomputer 60 either simply compiles the received data or additionally reconciles it with the data from the originator(s).

The above described system can be used to carry out, in accordance with the present invention, a method of identification and verification of broadcasted program segments, the method comprising: providing program segments having a subaudible preamble code, respective subaudible identification codes and a subaudible postamble code; broadcasting the program segments from a plurality of broadcast stations; receiving at a monitoring location broadcasted signals, including the program segments, from the plurality of broadcast stations; deriving from the received broadcast signals the preamble code, the respective program segment identification codes and the postamble code; providing at the monitoring location respective broadcast station identification signals; generating at the monitoring location respective date-indicating and time-indicating signals; storing at the monitoring location signals representing occurrences of the preamble code, the respective program segment identification codes and the postamble code when received, each broadcast station identification signal from which each program segment was received each time it is received therefrom and the date-indicating and time-indicating signals each time a program segment is received; and sending the stored signals as data to a central point which also receives data from other monitoring locations for compilation and/or reconciliation.

In accordance with the present invention, the disclosed system can be used to carry out a method of identification and verification of broadcasted program segments, the method comprising: providing program segments having a subaudible preamble code, respective subaudible program segment identification codes and a subaudible postamble codes; receiving at a monitoring location broadcasted signals, including the program segments, from a plurality of broadcast stations; deriving from the received broadcast signals the preamble code, the respective program segment identification codes and the postamble code; providing at the monitoring location respective broadcast station identification signals; generating at the monitoring location respective date-indicating and time-indicating signals; storing at the monitoring location signals representing occurrences of the recovered preamble code, the respective program segment identification codes and the postamble code, when received, each broadcast station identification signal from which each program segment was received each time it is received therefrom and the date-indicating and time-indicating signals each time a program segment is received; and sending the stored signals as data to a central point which also receives data from other monitoring locations for compilation and/or reconciliation.

The system can also be used to carry out a method of identification and verification of broadcasted program segments, the method comprising: providing program segments having a subaudible preamble code, respective subaudible program segment identification codes and a subaudible postamble code; receiving at a monitoring location broadcasted signals, including the program segments, from the plurality of broadcast stations; deriving from the received broadcast signals the preamble code, the respective program segment identification codes and the postamble code; providing at the monitoring station respective broadcast station identification signals; generating at the monitoring location respective date-indicating and time-indicating signals; and storing at the monitoring location as data signals representing occurrence of the preamble code, the respective program segment identification codes and the postamble code when received, each broadcast station identification signal from which each program segment was received each time it is received therefrom and the date-indicating and time-indicating signals each time a program segment is received.

The disclosed system can also carry out a method of identification and verification of broadcasted program segments, the method comprising: providing program segments having respective subaudible program segment identification codes; receiving at a monitoring location broadcasted signals, including the program segments, from the plurality of broadcast stations; deriving from the received broadcast signals the respective program segment identification codes; providing at the monitoring station respective broadcast station identification signals; generating at the monitoring location respective date-indicating and time-indicating signals; and storing at the monitoring location as data signals representing occurrence of the respective program segment identification codes when received, each broadcast station identification signal from which each program segment was received each time it is received therefrom and the date-indicating and time-indicating signals each time a program segment is received.

PROGRAMS

```
/* ENCODE.EXE
Commercial Verification Prototype

V0.3X
5-3-88
Modified format of preamble and letters to incorporate 0-to-1 transitions
at intervals; this is required to compensate for clock differences between
the encoder and decoder; it should also serve to compensate for any dis-
tortion introduced by the transmission medium.

Principally, the preamble is now formatted into blocks of 5 bits; the first
4 bits are 1's and the 5th is a 0; this makes is necessary that the preamble
length be an integer multiple of 5 bits.

The format of the letters is modified slightly; instead of starting at 0,
they now start at 1; this insures that there is always at least one bit
set during every letter.

V0.2X
5-4-88
Modified format of numbers from BCD to binary. This saves 2 bits.
The 2 bits were used to lengthen the validation sequence.

Added variable length encoding.

V0.1X
First prototype version
Created: 4-28-88 by GGS

Copyright C 1988

This program puts encoded 40Hz tones to an audio device connected
to the 8042 encoder.

Note:
This program requires no program-specific header files for compilation
*/ include <stdio.h>
include <dos.h>
```

```c
include <ctype.h> define CTLX    0x18            /* control-x */
define CTLZ    0x1a            /* control-z */
define MAXSTR  64              /* maximum entry string length */ main()
{ static char letters[8] = {"ABCD"},
        length[8] = {"10"},
        numbers[8] = {"1234"};

int c,
    stop;

/* initialize I/O */
ioinit();

/* set up the screen; use ANSI.SYS */ printf("\033[2J");
printf("\nCommercial Verification Prototype\n");
printf("Encoder -- Version 0.3X");

#ifdef  MONOCARD
printf("   (Monochrome Parallel Port)\n\n");
#else
printf("   (Parallel Port Adapter)\n\n");
#endif
        mov     dx,$iobase+1

0:      /* wait for active */ inb     al,dx
        testb   al,$8
        jnz     1f movb    ah,$1                   /* check keyboard */
        int     0x16
        jz      0b
        jmp     kbexit /* then turn on bit clock */
1:
        inb     al,ppi
        orb     al,$1
        outb    ppi,al /* get system time */
        movb    ah,$0x2c
        int     0x21

Lds     si,timeon(bp)
        movb    (si),ch
        add     si,$2
        movb    (si),cl
        add     si,$2
        movb    (si),dh
        add     si,$2
        movb    (si),dl
        add     si,$2

/* get date */
        movb    ah,$0x2a
        int     0x21 mov     (si),cx
        add     si,$2
        movb    (si),dh
        add     si,$2
        movb    (si),dl mov     dx,$iobase+1

/* the first bit has oddball timing */
```

```
            call    t0
            call    t3
            jz      abort dopre:  /* gather up the preamble; check for proper format */ call    getblk          /* get the 4 remaining bits of the block */
            jz      abort
            add     pcount,$5       /* update the preamble count */
            call    getbit          /* get the 1st bit of the next block */
            jnz     dopre           /* if it's 1, then it may be a new block */ jmp     dovalid abort:
            jmp     start dovalid:                            /* if 0, then it may the validation */
            call    getbit
            jz      abort           /* 1 */
            call    getbit
            jnz     abort           /* 0 */
            call    getbit
            jz      abort           /* 1 */
            call    getbit
            jnz     abort           /* 0 */
            call    getbit
            jz      abort           /* 1 */

/* if it gets this far, get 34 data bits and store them in bits[] */ mov     cx,$34
            Lds     si,bits(bp)

dobits:
            call    getbit
            movb    (si),al
            inc     si
            loop    dobits /* now do the post-amble */ mov     cx,pcount
            add     cx,$5 dopost:
            call    getbit
            jz      exit
            dec     cx
            jz      exit
            call    getbit
            jnz     exit
            loop    dopost exit:
            /* get system time */
            movb    ah,$0x2c
            int     0x21

Lds     si,timeoff(bp)
            movb    (si),ch
            add     si,$2
            movb    (si),cl
            add     si,$2
            movb    (si),dh
            add     si,$2
            movb    (si),dl
            add     si,$2

/* get date */
            movb    ah,$0x2a
            int     0x21 mov     (si),cx
            add     si,$2
```

```
            movb    (si),dh
            add     si,$2
            movb    (si),dl mov     ax,$1           /* set return status true */
            Leave waitoff:            /* wait for OUT inactive */
            inb     al,ppi+1
            testb   al,$0x20
            jnz     waitoff
            ret waiton:             /* wait for OUT active */
            inb     al,ppi+1
            testb   al,$0x20
            jz      waiton
            ret kbexit:
            mov     ax,$0           /* set status false */
            Leave getblk:
            call    getbit
            jz      gb0
            call    getbit
            jz      gb0
            call    getbit
            jz      gb0
            call    getbit
            jnz     gb0
            incb    al
            ret
gb0:
            xorb    al,al
            ret getbit:
            call    t0
            call    t1
            call    t2
            call    t3
            ret t0:     /* t0 state processor */
            call    waitoff
            call    waiton
            ret t1:     /* t1 state processor */
            push    dx              /* if data high, don't check for sync */
            mov     dx,$iobase+1
            inb     al,dx
            andb    al,$8
            jnz     t12

/* else check and resync if necessary */ t10:
            inb     al,ppi+1        /* check for OUT off */
            testb   al,$0x20
            jz      t11 inb     al,dx           /* then check for data transition */
            testb   al,$8
            jz      t10             /* if not, loop back */ call    resync          /* if yes, resync */
            jmp     t1exit          /* then exit */ t11:
```

```
        inb     al,ppi+1        /* check for OUT on */
        testb   al,$0x20
        jnz     t1exit          /* yes, exit */ inb     al,dx           /* no, then check for data transition */
        testb   al,$8
        jz      t11             /* if not, loop back */ call    resync          /* if yes, resync */
t1exit:
        pop     dx
        ret t12:    /* if there's no sync check */
        call    waitoff
        call    waiton
        pop     dx
        ret t2:     /* t2 state processor */
        push    dx              /* if data high, don't check for sync */
        mov     dx,$iobase+1
        inb     al,dx
        andb    al,$8
        jnz     t22

/* else check and resync if necessary */ t20:
        inb     al,ppi+1        /* check for OUT off */
        testb   al,$0x20
        jz      t21 inb     al,dx           /* then check for data transition */
        testb   al,$8
        jz      t20             /* if not, loop back */ call    resync          /* if yes, resync */
        jmp     t22 t21:
        inb     al,ppi+1        /* check for OUT on */
        testb   al,$0x20
        jnz     t2exit          /* yes, exit */ inb     al,dx           /* no, then check for data transition */
        testb   al,$8
        jz      t21             /* if not, loop back */ call    resync          /* if yes, resync */
        jmp     t22 t2exit:
        pop     dx
        ret t22:    /* if there's no sync check or just after a resync */
        call    waitoff
        call    waiton
        pop     dx
        ret t3:     /* t3 state processor */
        push    dx
        mov     dx,$iobase+1
        call    waitoff
        call    waiton
        inb     al,dx
        andb    al,$8
        pop     dx
        ret resync: /* realign clock with a bit edge */

/* re-program the timer and restart the counters */
```

```
/* make sure that gate is off */ inb     al,0x61
        andb    al,$0xfc
        outb    ppi,al

/* program the 8253 for use as a 20Hz counter; halt it for sync */ movb    al,$0xb6
        outb    pitcon,al
        mov     ax,$61032
        outb    pit2,al
        movb    al,ah
        outb    pit2,al /* now restart the clock */ inb     al,ppi
        orb     al,$1
        outb    ppi,al ret

/* DECASM

V0.3X
6-4-88

Assembly language module for the Commercial Verification Prototype Decoder

Called as:
dodecode (bits, &timeon,&timeoff)
char    bits[34];
struct time timeon,timeoff;

*/ include <larges.h>

.shrd pcount: .blkw   1       /* pre-/post-amble bit counter */

.shri ifdef MONOCARD
iobase = 0x3bc
#else
iobase = 0x378
endif pitcon = 0x43           /* PIT control port */
pit2   = 0x42           /* PIT channel 2 port */
ppi    = 0x61           /* PPI port B */ bits = LEFTARG
timeon = bits + DPL
timeoff = timeon + DPL

Enter (dodecode_)

Lds     si,timeon(bp)
        mov     cx,$7
        mov     ax,$0
0:
        mov     (si),ax
        add     si,$2
        loop    0b Lds     si,timeoff(bp)
        mov     cx,$7
1:
        mov     (si),ax
        add     si,$2
        loop    1b
```

```
start:

/* make sure that gate is off */ inb     al,0x61
        andb    al,$0xfc
        outb    ppi,al mov     pcount,$0

/* program the 8253 for use as a 20Hz counter; halt it for sync */ movb    al,$0xb6
        outb    pitcon,al
        mov     ax,$61032
        outb    pit2,al
        movb    al,ah
        outb    pit2,al
endif printf("   A - Enter Station ID\033[6;30H%s\n",station);
        printf("   B - Close Current Data File\n\n");
        printf("   C - Decode\n\n");
        printf("   Current Data File: %s\n\n",filename);
        printf("   ^X Exits to DOS\n\n");
        printf("Command ==>"); fflush(stdout);
        needmenu = 0;
    }
    else {
        printf ("\033[15;1H\033[KCommand ==> ");
        fflush (stdout);
    } c = getcnb();

switch (toupper(c)) {
    case 'A':
        sentry(station);
        printf("\033[6;30H\033[K%s",station);
        fflush(stdout);
        break;
    case 'B':
        fclose(file);
        if (fmt)
            unlink (filename);
        else
            ++fileext;
        sprintf(filename,"RCVDAT.%d",fileext);
        if (!(file = fopen(filename,"w"))) {
            printf("\033[20;1HCan't Open Data File: %s\n",filename);
            exit(1);
        }
        fmt = 1;
        printf("\033[11;23H\033[K%s",filename);
        fflush(stdout);
        break;
    case 'C':
        printf("\033[2J"); fflush(stdout);
        while (dodecode(bits,&timeon,&timeoff)) {
            btod(bits,data);
    printf("%s  %02d/%02d/%02d   ",
        station,timeon.month,timeon.day,timeon.year);
    printf("%02d:%02d:%02d.%02d  %s  %02d:%02d:%02d.%02d\n",
            timeon.hours,timeon.mins,
            timeon.secs,timeon.hsecs,data,timeoff.hours,
            timeoff.mins,timeoff.secs,timeoff.hsecs);
    fprintf(file,"%s  %02d/%02d/%02d   ",
        station,timeon.month,timeon.day,timeon.year);
    fprintf(file,"%02d:%02d:%02d.%02d  %s  %02d:%02d:%02d.%02d\n",
            timeon.hours,timeon.mins,
            timeon.secs,timeon.hsecs,data,timeoff.hours,
            timeoff.mins,timeoff.secs,timeoff.hsecs);
            fmt = 0;
        }
        needmenu = 1;
        break;
    case CTLX:
```

```
            fclose(file);
            if (fmt)
                unlink(filename);
            printf("\033[2J");
            fflush(stdout);
            exit(1);
            break;
        default:
            break;
        }
    }
} sentry(station)
char    station[];
{ char    scratch[32];
int i,c;

printf("\033[15;1H\033[KEnter Station ID: ");
fflush(stdout);

for (i = 0; (c = getchar()) != '\n' && i < 127; ++i)
    scratch[i] = toupper(c);

scratch[i] = '\0';

if (i)
    strcpy(station,scratch);

return;
}

/* convert bits to ASCII data */ btod (bits,data)
char bits[],data[];
{ int d,i,j,k,
    first,
    temp;

/* letters */
for (d = i = j = 0; j < 4; ++j) {
    for (k = temp = 0, first = 1; k < 5; ++k,++i) {
        if (first)
            first = 0;
        else
            temp <<= 1;

if (bits[i])
            temp |= 1;
        else
            temp &= 0xfffe;
    }
    data[d++] = temp + 'A' - 1;
}
data[d++] = '\40';
data[d] = '\0';

/* numbers */
for (k = temp = 0, first = 1; k < 14; ++k, ++i) {
    if (first)
        first = 0;
    else
        temp <<= 1;

if (bits[i])
        temp |= 1;
    else
        temp &= 0xfffe;
}
sprintf((data+d),"%04d\0",temp);
```

```
return;
}
/* DECODE.EXE
Commercial Verification Prototype
Decoder

V0.3X modified format to include 0-to-1 transitions at intervals; this allows
the local clock to re-sync with the incoming data stream and compensates
for clock differences between the encoder and decoder.

V0.2X
Initial prototype version
This must be used with the matching encoder version Note:
There are no program-specific header files required
*/ include <stdio.h>
include <dos.h>
include <ctype.h> define CTLX    0x18        /* control-x */
define CTLZ    0x1a        /* control-z */ main()
{ struct time {
    int hours,
        mins,
        secs,
        hsecs,
        year,
        month,
        day;
} timeon,timeoff;

char    data[32] = ("DEFAULT DATA"),
    bits[64];

static char station[128] = ("ABCD");

static char filename[16] = ("RCVDAT.0");

int c,
    needmenu,
    fmt,
    fileext,
    stop;

FILE    *file;

if (!(file = fopen(filename,"w"))) {
    printf("Can't Open Data File: %s\n", filename);
    exit (1);
} for (fileext = stop = 0, needmenu = fmt = 1; !stop; ) { if (needmenu) {
        /* set up screen; use ANSI.SYS */
        printf("\033[2J");
        fflush(stdout);
        printf("\nCommercial Verification Prototype\n");
        printf("Decoder -- Version 0.3X   ");

#ifdef MONOCARD
        printf("(Monochrome Parallel Adapter)\n\n\n");
#else
        printf("(Parallel Port Adapter)\n\n\n");
```

```
7:
        movb    al,$0
        outb    dx,al

Leave

* send encoded bits to the output medium */ count = LEFTARG
bits  = LEFTARG + DPL

Enter   (encout_)

mov     cx,count(bp)
        Lds     si,bits(bp)
        mov     dx,$iobase+1

/* force the start of a SYNC* epoch */ force0: /* wait for CLOCK* inactive */
        inb     al,dx
        andb    al,$0x10
        jz      force0

/* assert LOAD */ dec     dx
        movb    al,$2
        outb    dx,al
        inc     dx force1: /* wait for CLOCK* active */
        inb     al,dx
        andb    al,$0x10
        jnz     force1

/* remove LOAD */
        dec     dx
        movb    al,$0
        outb    dx,al /* ... then loop through the bits */ enc0:
        call    syncoff movb    al,(si)
        orb     al,al
        inb     al,dx
        jnz     enc1 andb    al,$0x7e
        jmp     enc2 enc1:
        orb     al,$1 enc2:
        outb    dx,al
        inc     si movb    ah,$1
        int     0x16
        jnz     enc3 call    syncon loop    enc0 enc3:
        inb     al,dx
        andb    al,$0xfe
        outb    dx,al
        Leave syncon:
```

```
        push    dx
        mov     dx,$iobase+1
son0:
        inb     al,dx
        andb    al,$8
        jnz     son0 pop     dx ret syncoff:
        push    dx
        mov     dx,$iobase+1
soff0:
        inb     al,dx
        andb    al,$8
        jz      soff0 pop     dx ret
```

/* Assembly language subroutines for Commercial Verification
Prototype; Version 0.1X

*/ Encoder Assy. Module

```
include         <larges.h> ifdef  MONOCARD
iobase = 0x3bc              /* Monochrome card parallel port address */
#else
iobase = 0x378              /* CGA or optional parallel port address */
#endif
```

/* initialize the parallel port to known values */

```
        Enter (ioinit_)

mov     dx,$iobase
        movb    al,$0
        outb    dx,al
        add     dx,$2
        outb    dx,al Leave
```

/* turn the tone on */

```
        Enter (toneon_)

mov     dx,$iobase
        inb     al,dx
        orb     al,$1
        outb    dx,al Leave
```

/* turn the tone off */

```
        Enter (toneoff_)

mov     dx,$iobase
        inb     al,dx
        andb    al,$0xfe
        outb    dx,al Leave
```

/* turn the tone on and off in an alternating pattern of 1's and 0's
*/

```
        Enter (pattern_)
```

```
        mov     dx,$iobase
1:
        call    syncoff         /* wait for sync inactive */ movb    ah,$1           /* check for abort */
        int     0x16
        jnz     3f inb     al,dx           /* toggle modulation */
        xorb    al,$1
        outb    dx,al call    syncon movb    ah,$1
        int     0x16
        jnz     3f jmp     1b
```
```c
printf("Copyright C 1988\n\n\n");

printf("    A - Tone On\n");
printf("    B - Tone Off\n");
printf("    C - 1/0 Pattern\n\n");
printf("    D - Enter Letters    ABCD\n");
printf("    E - Enter Numbers    1234\n\n");
printf("    F - Enter Length     10\n\n");
printf("    G - Arm Encoder\n\n");
printf("    ^X Exits to DOS\n\n");
fflush(stdout);

for (stop = 0; !stop; ) {
    printf("\033[21;1H\033[KCommand ==>");
    fflush(stdout);
    c = getcnb();
    switch(toupper(c)) {
    case 'A':
        toneon();
        break;
    case 'B':
        toneoff();
        break;
    case 'C':
        printf("\033[21;1H\033[KAny key quits");
        fflush(stdout);
        pattern();
        break;
    case 'D':
        lentry(letters);
        break;
    case 'E':
        nentry(numbers);
        break;
    case 'F':
        tentry(length);
        break;
    case 'G':
        doencode(letters,numbers,length);
        break;
    case CTLX:
        printf("\033[2J");
        fflush(stdout);
        exit(1);
        break;
    default:
        break;
    }
}
} lentry(letters)
char    letters[];
{
char    scratch[MAXSTR+2];

int i,c;
```

```
printf("\033[21;1H\033[KLetters: ");
fflush(stdout);

strcpy(scratch,letters);

for (i = 0; (c = getchar()) != '\n' && i < MAXSTR;) {
    if (isalpha(c))
        scratch[i++] = toupper(c);
} scratch[4] = '\0';

printf("\033[12;25H\033[K%s",scratch);
fflush(stdout);

strcpy(letters,scratch);
return;
} nentry(numbers)
char    numbers[];
{ int i,c;

char    scratch[MAXSTR+2];

printf("\033[21;1H\033[KNumbers: ");
fflush(stdout);

strcpy(scratch,numbers);

for (i = 0; (c=getchar()) != '\n' && i < MAXSTR;) {
    if (isdigit(c))
        scratch[i++] = c;
} scratch[4] = '\0';

printf("\033[13;25H\033[K%s",scratch);
fflush(stdout);

strcpy(numbers,scratch);

return;
} doencode(letters,numbers,length)
char    letters[],numbers[],length[];
{ int first,
    temp,
    preblks,postsize,
    totalbits,
    count,i,j,k,c;

unsigned int    mask;

char    *bits;
unsigned char   d;

char    *calloc();

totalbits = atoi(length) * 5;

if (!(bits = calloc (totalbits+8,sizeof(char)))) {
    printf("\033[21;1HMemory allocation error");
    fflush(stdout);
    exit(0);
} preblks = (totalbits - 40)/10;
postsize = totalbits - (preblks * 5) - 40;
```

```
for (i = j = 0; j < preblks; ++j) {
    for (k = 0; k < 4; ++k)
        bits[i++] = '\001';
    bits[i++] = '\000';
} bits[i++] = '\0';
bits[i++] = '\001';
bits[i++] = '\0';
bits[i++] = '\001';
bits[i++] = '\0';
bits[i++] = '\001';

for (j = 0; j < 4; ++j) {
    d = letters[j] - 'A' + 1;
    bits[i++] = d & 0x10;
    bits[i++] = d & 0x08;
    bits[i++] = d & 0x04;
    bits[i++] = d & 0x02;
    bits[i++] = d & 0x01;
} mask = 0x2000;
temp = (atoi(numbers) & 0x3fff);

for (j = 0, first = 1; j < 14;++j, ++i) {
    if (first)
        first = 0;
    else
        mask >>= 1;

bits[i] = (temp & mask) ? '\001' : '\000';
} for (d = '\000'; i < totalbits; ++i) {
    d = (d) ? '\000' : '\001';
    bits[i] = d;
} count = i;

printf("\033[21;1H\033[K %d READY -- RET to start; ^Z quits",count);
fflush(stdout);

while ((c = getcnb()) != '\r') {
    if (c == CTLZ)
        return;
} printf("\033[21;1H\033[KAny key aborts");
fflush(stdout);

encout(count,bits);

/*
printf("\033[22;1H\033[K"); fflush(stdout);
for (i=0; i < count; ++i)
    putcnb ((bits[i]) ? '1' : '0');
*/
free (bits);

printf("\033[21;1H\033[KFinished -- Any key resumes");
fflush(stdout);

getcnb();

} tentry(length)
char    length[];
```

```
{
int i,c;

char    scratch[MAXSTR+2];

printf("\033[21;1H\033[KLength (seconds): ");
fflush(stdout);

strcpy(scratch,length);

for (i = 0; (c=getchar()) != '\n' && i < MAXSTR;) {
    if (isdigit(c))
        scratch[i++] = c;
} scratch[2] = '\0';

if (atoi(scratch) >= 10) {
    printf("\033[15;25H\033[K%s",scratch);
    fflush(stdout);
    strcpy(length,scratch);
} return;
}
```

It is to be understood that the foregoing description and accompanying drawings relate to preferred embodiments set out by way of example, not by way of limitation. Numerous other embodiments and variants are possible without departing from the spirit and scope of the present invention, its scope being defined by the appended claims.

What is claimed is:

1. A system for identification and verification of broadcasted program segments, the system comprising:
   a plurality of broadcasting stations for broadcasting signals which include program segments having a subaudible preamble code, respective subaudible program segment identification codes, following each preamble code occurrence and a subaudible postamble code following each program segment identification code occurrence;
   at least one monitoring station for receiving the broadcasted signals, said monitoring station including (a) means for generating date-indicating and time-indicating signals, (b) respective channels responsive to the broadcasted signal from each respective broadcasting station for recovering each received preamble code, each received respective program segment identification code and each received postamble code and (c) means for providing respective broadcast station-identification signals;
   means at the monitoring station for storing data signal representations of each recovered preamble code, recovered respective program segment identification codes and recovered postamble code, the date-indicating and time-indicating signals, and the station-identifying signals for each channel; and
   means at the monitoring station for sending the stored data signal representations to a central station, the central station being provided with means for receiving data from a plurality of monitoring station to compile and/or to reconcile same.

2. The system according to claim 1, wherein the plurality of broadcasting stations include television stations and standard radio broadcasting stations.

3. The system according to claim 2, wherein the standard radio broadcasting stations include frequency modulation broadcast stations and amplitude modulation broadcast stations.

4. The system according to claim 1, wherein at least some of the broadcast stations are those of a cable distribution network.

5. The system according to claim 1, wherein the subaudible program segment identification codes consist of respective series of alphanumeric characters.

6. The system according to claim 5, wherein the alphanumeric characters are formed by a series of mark signals and space signals, defined respectively by presence and absence of a 40 Hz. subaudible tone.

7. The system according to claim 5, wherein the subaudible preamble code consists of a predetermined number of cycles of 40 Hz. and wherein the subaudible postamble code consists of a given number of cycles of 40 Hz.

8. The system according to claim 1, wherein the subaudible preamble code consists of a predetermined number of cycles of 40 Hz. and wherein the subaudible postamble code consists of a given number of cycles of 40 Hz.

9. The system according to claim 1, wherein respective said program segment identification codes are repeated during periods of time between the preamble code and postamble code, whereby it may be determined if program segments have been transmitted in the entirety.

10. The system according to claim 1, wherein at least some of the program segments are commercial message segments.

11. In a system for identification and verification of broadcasted program segments from a plurality of broadcasting stations,
   at least one monitoring station for receiving broadcasted signals from said broadcasting stations, said monitoring station including (a) means for generating date-indicating and tie-indicating signals, (b) respective channels responsive to respective broadcasted signals from respective broadcasting stations for recovering a subaudible preamble code, respective subaudible program segment identification codes and a subaudible postamble code, and (c)

means for providing respective broadcast station-identification signals;

means at the monitoring station for storing data signal representations of each recovered preamble code, recovered respective program identification codes and postamble code, the date-indicating and time-indicating signals, and the station-identifying signals for each channel; and means at the monitoring station for sending the stored data signal representations to a central station, the central station being provided with means for receiving data from a plurality of monitoring stations to compile and/or to reconcile same.

12. The system according to claim 11, wherein the subaudible program segment identification codes consist of respective series of alphanumeric characters.

13. The system according to claim 12, wherein the alphanumeric characters are formed by a series of mark signals and space signals, defined respectively by presence and absence of a 40 Hz. subaudible tone.

14. The system according to claim 12, wherein the subaudible preamble code consists of a predetermined number of cycles of 40 Hz. and wherein the subaudible postamble code consists of a given number of cycles of 40 Hz.

15. The system according to claim 11, wherein the subaudible preamble code consists of a predetermined number of cycles of 40 Hz. and wherein the subaudible postamble code consists of a given number of cycles of 40 Hz.

16. The system according to claim 11, wherein respective said program segment identification codes are repeated during periods of time between the preamble code and postamble code, whereby it may be determined if program segments have been transmitted in the entirety.

17. The system according to claim 11, wherein at least some of the program segments are commercial message segments.

18. In a system for identification and verification of broadcasted program segments from a plurality of broadcasting stations, at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering a subaudible preamble code, respective subaudible program segment identifications codes of each program segment received therefrom and a subaudible postamble code, and (c) means for providing respective broadcast station-identification signals; and means at the monitoring station for storing data signal representations of each recovered preamble code, recovered program segment, postamble code, identification codes, the date-indicating and time-indicating signals, and the station-identifying signals for each channel.

19. The system according to claim 18, wherein the subaudible program segment identification codes consist of respective series of alphanumeric characters.

20. The system according to claim 19, wherein the alphanumeric characters are formed by a series of mark signals and space signals, defined respectively by presence and absence of a 40 Hz. subaudible tone.

21. The system according to claim 19, wherein the subaudible preamble code consists of a predetermined number of cycles of 40 Hz. and wherein the subaudible postamble code consists of a given number of cycles of 40 Hz.

22. The system according to claim 18, wherein the subaudible preamble code consists of a predetermined number of cycles of 40 Hz. and wherein the subaudible postamble code consists of a given number of cycles of 40 Hz.

23. The system according to claim 18, wherein respective said program segment identification codes are repeated during periods of time between the preamble code and postamble code, whereby it may be determined if program segments have been transmitted in the entirety.

24. The system according to claim 18, wherein at least some of the program segments are commercial message segments.

25. In a system for identification and verification of broadcasted program segments from a plurality of broadcasting stations, at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering subaudible program segment identification codes consisting of respective series of alphanumeric characters therefrom, and (c) means for providing respective broadcast station-identification signals; and means at the monitoring station for storing data signal representations of recovered program segment and identification codes, and date-indicating and time-indicating signals, and the station-identifying signals for each channel; and wherein the alphanumeric characters are formed by a series of mark signals and space signals, defined by presence and absence of a 40 Hz. subaudible tone.

26. The system according to claim 25, wherein each of the respective series of alphanumeric characters consists of a respective series of four letters and four numerals.

27. In a system for identification and verification of broadcasted program segments from a plurality of broadcasting stations, at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering a preamble code, program segment identification codes and a postamble code therefrom, respective said program segment identification codes being repeated during periods of time between the preamble code and the postamble code whereby it may be determined if the respective program segments have been transmitted in the entirety, and (c) means for providing respective broadcast station-identification signals; and means at the monitoring station for storing data signal representations of each recovered preamble, postamble and program segment identification codes, the date-indicating and time-indicating signals, and the station-identifying signals for each channel.

28. Method of identification and verification of broadcasted program segments, the method comprising:
 providing program segments having a subaudible preamble code, respective subaudible program segment identification codes and a subaudible postamble code;
 broadcasting the program segments from a plurality of broadcast stations;
 receiving at a monitoring location broadcasted signals, including the program segments, from the plurality of broadcast stations;
 deriving from the received broadcast signals the preamble code, the respective program segment identification codes and the postamble code;
 providing at the monitoring location respective broadcast station identification signals;
 generating at the monitoring location respective date-indicating and time-indicating signals;
 storing at the monitoring location signals representing the preamble code, the respective program segment identification codes and the postamble code when received, each broadcast station identification signal from which each program segment was received each time it is received therefrom and the date-indicating and time-indicating signals each time a program segment is received; and
 sending the stored signals as data to a central point which also receives data from other monitoring locations for compilation and/or reconciliation.

29. Method of identification and verification of broadcasted program segments, the method comprising:
 providing program segments having a subaudible preamble code, respective subaudible program segment identification codes and a subaudible postamble code;
 receiving at a monitoring location broadcasted signals, including the program segments, from a plurality of broadcast stations;
 deriving from the received broadcast signals the preamble code, the respective program segment identification codes and the postamble code;
 providing at the monitoring location respective broadcast station identification signals;
 generating at the monitoring location respective date-indicating and time-indicating signals;
 storing at the monitoring location signals representing the recovered preamble code, the respective program segment identification codes and the postamble code, when received, each broadcast station identification signal from which each program segment was received each time it is received therefrom and the date-indicating and time-indicating signals each time a program segment is received; and
 sending the stored signals as data to a central point which also receives data from other monitoring locations for compilation and/or reconciliation.

30. Method of identification and verification of broadcasted program segments, the method comprising:
 providing program segments containing commercial messages and having a subaudible preamble code, respective subaudible program segment identification codes and a subaudible postamble code;
 receiving at a monitoring location broadcasted signals, including the program segments, from the plurality of broadcast stations;
 deriving from the received broadcast signals the preamble code, the respective program segment identification codes and the postamble code;
 providing at the monitoring station respective broadcast station identification signals;
 generating at the monitoring location respective date-indicating and time-indicating signals; and
 storing at the monitoring location data signals representing the preamble code, the respective program segment identification codes and the postamble code when received, each broadcast station identification signal from which each program segment was received each time it is received therefrom and the date-indicating and time-indicating signals each time a program segment containing a commercial message is received.

31. Method of identification and verification of broadcasted program segments, and method comprising:
 providing program segments having respective subaudible program segment identification codes and a postamble code;
 receiving at a monitoring location broadcasted signals, including the program segments, from the plurality of broadcast stations;
 deriving from the received broadcast signals the respective program segment identification codes and the postamble code;
 providing at the monitoring station respective broadcast station identification signals;
 generating at the monitoring location respective date-indicating and time-indicating signals; and
 storing at the monitoring location data signals representing the respective program segment identification codes when received, the postamble code, each broadcast station identification signal from which each program segment was received each time it is received therefrom and the date-indicating and time-indicating signals each time a program segment is received.

32. In a system for identification and verification of broadcasted program segments from a plurality of broadcasting stations,
 at least one monitoring station for receiving broadcasted signals from said broadcasting stations, said monitoring station including (a) means for generating date-indicating and time-indicating signals, (b) respective channels responsive to respective broadcasted signals from respective broadcasting stations for recovering subaudible program segment identification codes consisting of respective series of alphanumeric characters therefrom, and (c) means for providing respective broadcast station-identification signals; and
 means at the monitoring station for storing data signal representations of the recovered program segment and identification codes, and date-indicating and time-indicating signals, and the station-identifying signals for each channel; and
 wherein the alphanumeric characters are formed by a series of mark and space signals, defined by the presence and absence of a tone, having a frequency below the range of human hearing.

33. The system according to claim 32, wherein each of the respective series of alphanumeric characters consists of respective series of four letters and four numerals.

* * * * *